Figure 1:
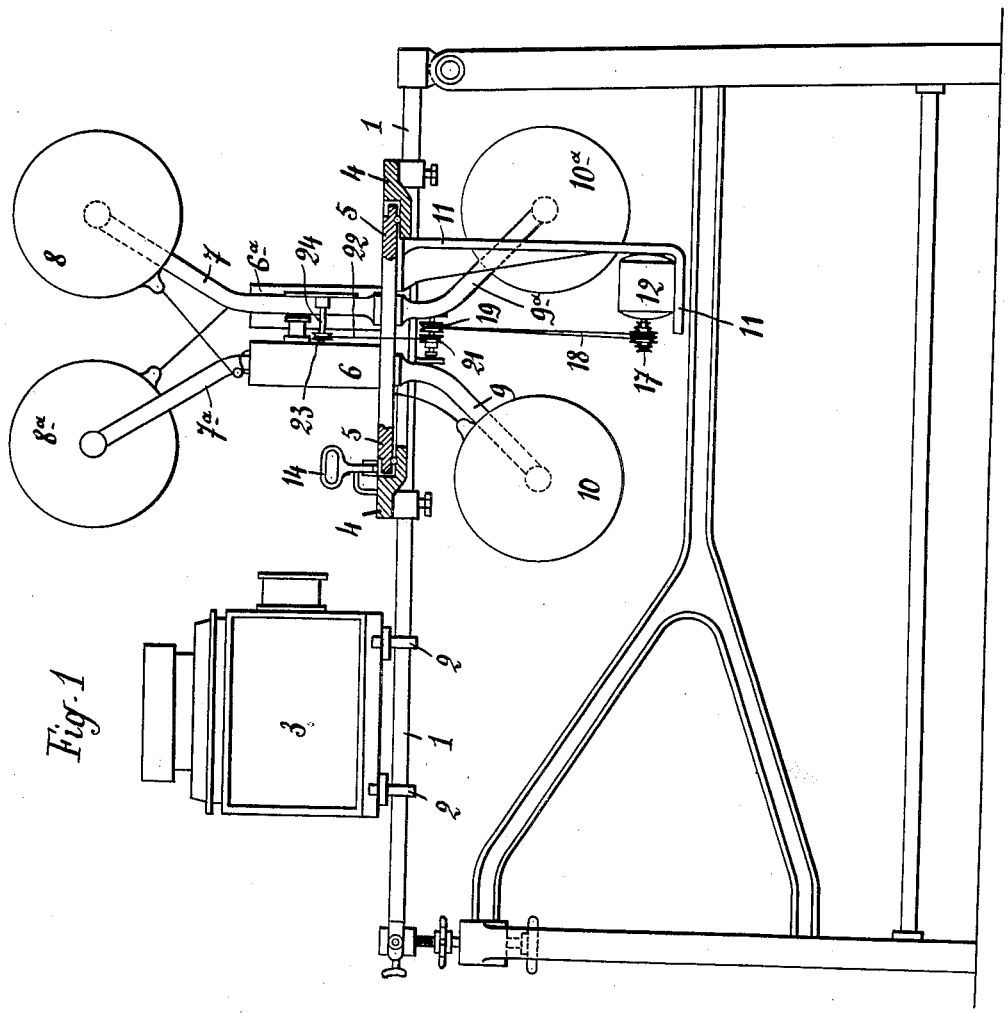

July 17, 1923.

L. FRASSIER 1,461,870

CINEMATOGRAPHIC PROJECTION APPARATUS

Filed Jan. 16, 1922

3 Sheets-Sheet 2

Inventor.

Léon Frassier

July 17, 1923.
L. FRASSIER
1,461,870
CINEMATOGRAPHIC PROJECTION APPARATUS
Filed Jan. 16, 1922   3 Sheets-Sheet 3
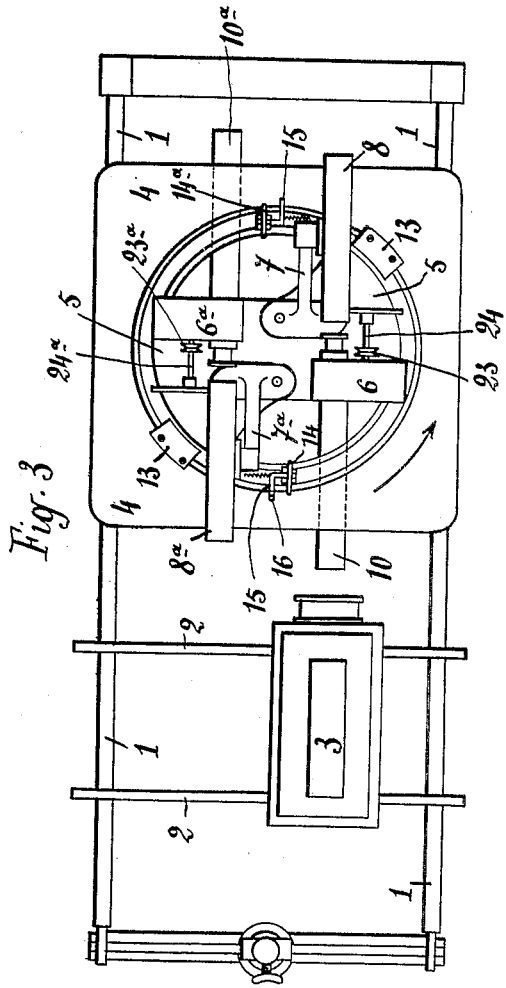
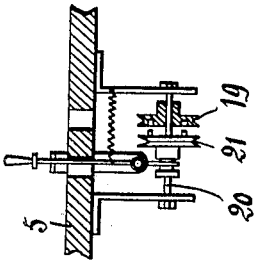
Inventor.
Léon Frassier Patented July 17, 1923.

1,461,870

UNITED STATES PATENT OFFICE.

LÉON FRASSIER, OF PARIS, FRANCE.

CINEMATOGRAPHIC PROJECTION APPARATUS.

Application filed January 16, 1922. Serial No. 529,725.

*To all whom it may concern:*

Be it known that I, LÉON FRASSIER, engineer, citizen of the Republic of France, residing at Paris, France, 77 Rue du Faubourg Saint-Denis, have invented certain new and useful Improvements in or Relating to Cinematographic Projection Apparatus, of which the following is a specification.

In cinematographic projection, bobbins are actually used which contain films of very considerable length 300 m., 400 m. and more.

If only a single projection apparatus, that is, an apparatus consisting of the projector proper and the lantern containing the source of light, is used, it is necessary when the contents of a bobbin has been projected to the screen, to stop the projection for a fairly considerable length of time, which is required for replacing the empty upper supply bobbin, inserting the film into the projector and wrapping the film upon the lower receiving bobbin.

In order to avoid any interruption of the projection, two complete projection apparatus can be used, that is two projectors and two lanterns, each projection apparatus being mounted upon a separate table, but in this case the cost of the installation is very considerable and the narrow space of the cubicle becomes very congested.

The improved projection apparatus forming the subject of the present invention enables the bobbins containing films of considerable length to be projected successively by means of a single lantern with its source of light and two projectors proper, the whole apparatus being mounted upon a single table which considerably reduces the congestion and also the initial cost of installation.

The improved arrangement comprises substantially a fixed plate integral with or fixed to the table proper upon which is rotatably mounted a circular plate or support carrying the motor and two complete projectors arranged in staggered relation like the squares of a chess board, which may alternately be brought within the axis of the single source of light by half a revolution of the circular support.

The result of this arrangement is that after the supply bobbin of the projector has been emptied, the second projector may be brought exactly into the position previously occupied by the first projector by giving the circular support half a turn, whereupon the second projector may be immediately started to continue the projection. During the projection of the film the operator may remove the empty bobbin from the first projector and substitute a full bobbin. The second projector may thus be charged and prepared during the projection of the film contained in the first projector, so that it is quite ready to be substituted as soon as required.

The accompanying drawings show by way of example one construction embodying the features of the invention.

Figure 2:
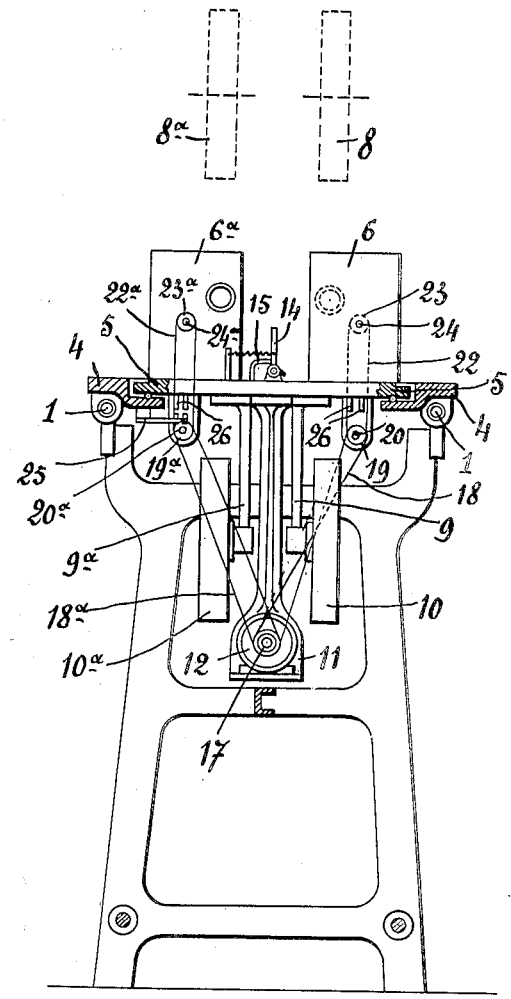

Fig. 1 is an elevation partly in section of the complete apparatus. Fig. 2 is a cross section, Fig. 3 is a plan, and Fig. 4 shows a detail.

The complete projection apparatus comprises one single table which is provided with an arrangement for regulating the downward inclination of the table. The table comprises two longitudinal tubes 1, 1 upon which are adapted to slide the guides 2, 2 of the single lantern 3 containing the source of light. The tubes 1, 1 carry also a ring shaped member 4 having an annular depression within which is disposed a platform or support 5 adapted to turn upon balls carried by the member 4. The platform or support 5 carries upon its upper surface two projectors 6, 6ª which are arranged in staggered relation and symmetrically with regard to the centre of the member so that they may be alternately placed within the optical axis of the lantern 3. The platform also carries arms 7, 7ª upon which are mounted the casings 8, 8ª of the supply bobbins of the projectors. The inside of the platform carries arms 9, 9ª upon which are mounted the casings 10, 10ª of the receiving bobbins, and a bracket 11, upon which is mounted an electric motor 12. The electric motor thus participates in the movement of the support 5. The mechanism by which the movement of the motor is transmitted to the two projectors will presently be explained.

In order to avoid any accidental lifting of the support 5 any suitable device may be used, for instance a number of flaps 13 fixed to the plate 4 having projections overlapping the outer edge portion of the circular support.

The platform or circular support may be further provided with any suitable locking device by which it is automatically arrested in the required position after having been turned half a revolution. For this purpose two spring handles 14, 14ª carried by the platform 5 may be used each of which is provided with a projection 15 which automatically takes into a hole 16 formed in the member 4 so as to lock the support in the required position.

The movement of the motor 12 is transmitted to the two projectors by means of cords arranged in the manner particularly shown in Figs. 1—2.

The pulleys 17, keyed to the shaft of the motor 12 transmit the movement through cords 18 to loose pulleys 19 and 19ª mounted upon the shafts 20, 20ª. Upon these shafts are mounted other pulleys 21 which may be coupled to the pulleys 19, 19ª by means of any suitable coupling device, for instance a device of the kind shown in Fig. 4. The pulleys 21 drive by means of cords 22, 22ª other pulleys 23, 23ª keyed upon the shafts 24, 24ª which drive the mechanisms of the projectors 6 and 6ª respectively.

The current is supplied to the motor 12 for instance by means of a double contact 25, carried by the member 4 and connected to the supply wires, which contact 25 engages, according to the position occupied by the turn-table 5, with either of two pairs of springs 26 carried by the table 5 and connected by wires with the terminals of the motor 12.

In the position shown in the drawings, the projector 6 is in operation its axis of projection being exactly in line with that of the lantern. When the film contained in the bobbin enclosed in the casing 8 has been entirely projected, the pulley 21 of the projector 6 is uncoupled and the platform 5 is given half a turn by means of the handle 14 whereby the projector 6ª is placed into proper working position. The upper casing of this projector has been previously charged with a bobbin containing a film during the projection of the film on the projector 6. When the platform has performed half a revolution the lock 15 carried by the handle 14ª snaps into the hole 16 of the member 4 and arrests and locks the turn-table 5. The projector 6ª then occupies exactly the position previously occupied by the projector 6. In order to start the projector 6ª it is now sufficient to couple the pulley 21 with the pulley 19ª.

Having now described and ascertained the nature of my said invention and in what manner the same is to be performed, I declare that what I claim is:—

1. In cinematographic projection apparatus, a source of light, a turn-table, a ring-shaped support for said turn-table, two projectors disposed upon said turn-table in staggered relation and symmetrically with regard to the center of the turn-table, said turn-table being rotatable to bring said projectors alternately with their axes of projection in alinement with the axis of projection of said source of light, a bracket depending from said turn-table and moving therewith, an electric motor supported by said bracket, an electric circuit to said motor for transmission of electric current thereto, operative connections between said motor and said projectors for selectively actuating the latter, and means for automatically closing said circuit when said turn-table has been moved to bring either one of said projectors with its axis of projection in alinement with the axis of projection of said source of light, and for breaking said circuit during the interval of rotation of said turn-table when neither one of said projectors is in position with respect to said source of light.

2. The apparatus described in claim 1, combined with means for automatically arresting movement of said turn-table when it has been moved to present either one of said projectors in proper position with respect to said source of light.

In testimony whereof I affix my signature.

LÉON FRASSIER.